United States Patent

[11] 3,573,426

[72] Inventors Paul Desmond Blake
Bishops Stortford;
Roy Douglas Johnston, Braughing Ware;
Brian Phelps, Roydon near Harlow; Edwin
Albert Chapman, Cuffley, Potters Bar;
Ronald Leonard Bartlett, Cheshunt,
England
[21] Appl. No. 661,637
[22] Filed Aug. 18, 1967
[45] Patented Apr. 6, 1971
[73] Assignee Murex Welding Processes Limited
Waltham Cross Hertfordshire, England
[32] Priority Oct. 31, 1966, Nov. 1, 1966, Nov. 8, 1966,
Mar. 15, 1967, Mar. 28, 1967, Apr. 5,
1967, Apr. 5, 1967, Apr. 10, 1967
[33] Great Britain
[31] 48640/66, 48972/66, 49927/66, 12186/67,
13776/67, 15579/67, 15578/67 and
16380/67

[54] ARC WELDING
6 Claims, 3 Drawing Figs.
[52] U.S. Cl. .................................................. 219/146
[51] Int. Cl. .................................................. B23k 35/22
[50] Field of Search .................................................. 219/146;
117/205, 207; 148/24, 26

[56] References Cited
UNITED STATES PATENTS
3,177,340 4/1965 Danhier .................. 219/146
2,520,806 11/1949 Kihlgren .................. 117/205

Primary Examiner—J. V. Truhe
Assistant Examiner—Lawrence A. Rouse
Attorney—Cushman, Darby & Cushman ABSTRACT: Process for the arc welding of mild steel workpieces without external shielding of the arc by the use of cored tubular electrodes which deposit weld metal of improved physical properties and containing 0.5—1.3 percent aluminum 0.3—2 percent manganese, 0.1—1 percent silicon, not more than 0.12 percent carbon, and not more than 0.2 percent titanium, the balance substantially iron.

PATENTED APR 6 1971 3,573,426

INVENTORS
PAUL DESMOND BLAKE
ROY DOUGLAS JOHNSTON
BRIAN PHELPS
EDWIN ALBERT CHAPMAN
RONALD LEONARD BARTLETT

By Cushman, Darby & Cushman
Attorneys

ARC WELDING

It has long been the practice to use for automatic and semiautomatic arc welding continuous electrodes which are devoid of an external flux coating in conjunction with a submerged arc flux or a shielding gas and in recent years widespread use has been made of carbon dioxide as the shielding gas.

An important function of the submerged arc flux and of the shielding gas has been to deny access to the weld metal of atmospheric oxygen and nitrogen. The use of a submerged arc flux, however, prevents observation of the weld metal by the operator, while the use of a shielding gas is costly and requires cumbersome equipment. It has been proposed to avoid the necessity for external shielding of the weld metal by the use of a tubular electrode, consisting of a mild steel sheath having no external flux coating but having a core containing deoxidizing elements, for example manganese, aluminum and silicon, and also elements, such as aluminum, which are capable of combining with nitrogen to form nitrides. Tubular electrodes of this kind as hitherto proposed have not, however, been capable of producing sound weld metal having the high ductility and good impact strength characteristic of the mild steel weld metal produced by good quality automatic electrodes used with a shielding medium.

The invention, in its broadest aspect, is based upon our discovery that sound weld metal appropriate for welding mild steel workpieces and having such satisfactory physical properties can be produced by the use of a bare mild steel tubular arc welding electrode, containing deoxidizers and nitrogen-fixing elements in its core, without shielding of the arc by gas or a submerged arc flux provided that the electrode is so formulated and the arc is drawn under conditions such that the contents of carbon, aluminum, manganese, silicon and titanium in the weld metal are maintained within definite prescribed limits indicated below.

The invention provides a process of automatic or semiautomatic welding which consists in depositing from a cored tubular electrode, having a mild steel sheath devoid of external flux, without external shielding of the arc weld metal having an elongation of at least 18 percent, a reduction of area of at least 25 percent and a Charpy impact strength of at least 35 ft/lbs. at 20° C and at least 20 ft/lbs. at −30° C when tested in accordance with the mechanical test procedure given in B.S.S. 639, 1964, the weld metal being of the following composition by weight:

aluminium—0.05—1.3 percent
manganese—0.3—2 percent
silicon—0.1—1 percent
carbon—0.12 percent max.
titanium—0.12 percent max. if the silicon content exceeds 0.35 percent and 0.25 percent max. if the silicon content is 0.35 percent or less
balance–iron apart from incidental impurities.

The incidental impurities include sulfur and phosphorus and may include zirconium in an amount not exceeding 0.05 percent by weight.

Preferably the weld metal contains 0.12—0.8 percent aluminum, 0.7—1.75 percent manganese, 0.4—0.85 percent silicon and a maximum carbon content of 0.08 percent.

Proportions throughout the Specification are proportions by weight and the mechanical properties of weld metal are those obtained by tests in accordance with the mechanical test procedure of B.S.S. 639, 1964.

Electrodes for carrying out the process according to the invention have a mild steel sheath, which may be formed from either rimming steel strip containing less than 0.12 percent carbon, 0.2—0.6 percent manganese, less than 0.5 percent silicon, less than 0.04 percent sulfur and less than 0.04 percent phosphorus, or from killed or semikilled strip with up to 0.3 percent silicon, up to 0.15 percent carbon, up to 1.8 percent manganese, less than 0.04 percent sulfur and less than 0.04 percent phosphorus.

The aluminum content of the electrode, which is present in the core, may be metallic aluminum or ferroaluminium and the core will normally contain both manganese and silicon, as such or as ferroalloys or present as compounds, such as manganese oxide or silica, which will be reduced by aluminum to elementary form when the electrode is used for welding. The electrodes also contain in the core sufficient calcium fluoride, or of a balanced mixture of other fluorides of alkali or alkaline earth metals to ensure regular burnoff of the tip of the electrode and satisfactory spreading and wetting qualities of the slag and weld metal in order to ensure absence of significant porosity in the weld metal.

In general electrodes according to the invention may be manufactured by bending a mild steel strip, of width 0.6 inches and thickness 0.025, inches into a U-shaped channel measuring 0.2 across its mouth, introducing the core material into the channel, closing the channel and drawing it down to a diameter between three sixty-fourths and one-eighth inch. In order to remove moisture and drawing soap the resulting tube should be baked in air at 250—300° C for 30 to 60 minutes and it may then be coiled on spools. As an alternative, and if it is desired to reduce the springiness of the coils, the tube may instead be baked at 450° C in an atmosphere of nitrogen.

These electrodes fall into various categories, which will now be described in detail.

Category 1

Electrodes of this category contain in the core metal powders or wires in amounts such that the electrode as a whole contains 0.8—2.5 percent aluminum 0.01—1 percent titanium, 0.05—1.5 percent silicon and 0.4—1.5 percent manganese; 0.4—6 percent of fluorides of alkali or alkaline earth metals and slag forming materials. The aluminum silicon and manganese act as deoxidizers and, in addition, both the aluminum and silicon reduce nitrogen absorption by the weld pool and fix free nitrogen as nitride. Although titanium increases the nitrogen solubility in the weld pool, it also acts as a nitrogen fixing element and fixes the nitrogen in the relatively harmless form of titanium carbonitride which does not form a dendritic structure. Concentrations of titanium in excess of that just stated are deleterious to the impact properties and could result in recovery into the weld metal of an amount of titanium greater than that specified above. The core generally amounts to 25—30 percent by weight of the electrode.

While the electrodes of this category must contain at least 0.4 percent of fluorides of alkali and/or alkaline earth metals, which may be present as borofluorides, silicofluorides or titanofluorides, some of the fluoride content in excess of 0.4 percent may be replaced by carbonates or titanates of alkali or alkaline earth metals. These ingredients give a stable arc, reducing spatter and loss of alloying elements and improving the general ease of operation of the electrode.

Alumina derived by oxidation from aluminum in the core tends to give an infusible and adherent slag and the slag formers in the core are materials which are capable of forming with this alumina a slag of low melting point. Fluxes based on sodium oxide, and/or potassium oxide together with silica are capable of taking up alumina up to about 50 percent of their weight while retaining a melting range of 1300—1500° C. Limited additions of lime and iron oxide help to retain a low melting point. The fluxes may consist of potash felspar, which contains approximately 14 percent $K_2$, 62 percent $SiO_2$, 1 percent $Na_2$ and 18 percent $Al_2O_3$ or of synthetic fused potassium silicate. Alternatively, soda felspar containing approximately 11 percent $N_2O$, 68 $SiO_2$ and 19 percent $Al_2O_3$ or sodalime felspar or fused sodium silicate are suitable. They may be used alone or as a mixture. The amounts of these materials, based on the weight of the electrode, are:

1. 4—8 percent potash felspar and/or soda felspar and/or lime felspar, or 4—8 percent of fused potassium silicate and/or sodium silicate.
2. 0—2 percent of calcium carbonate.

3. 0—5 percent of calcium metasilicate as natural or synthetic wollastonite.

4. 0—5 percent magnetic iron oxide or other iron oxide. The total amount of slag forming elements added is, in general, less than 10 percent.

Electrodes of this category yield weld metal of the following percentage composition:

|  | Overall range | Preferred range |
|---|---|---|
| Aluminium | 0.2–0.85 | 0.3–0.5 |
| Silicon | 0.05–0.5 | 0.25–0.35 |
| Manganese | 0.3–1.5 | 0.8–1.0 |
| Titanium | 0.02–0.4 | 0.05–0.1 |
| Sulphur | [1] 0.035 | 0.01–0.02 |
| Phosphorus | [1] 0.035 | 0.01–0.02 |
| Iron (apart from incidental impurities) | Balance | Balance |

[1] Maximum.

The weld metal obtained has an ultimate tensile strength of 28—36 tons per square inch, an elongation of 21—35 percent, a reduction of area of 35—75 percent and a Charpy impact strength as specified above.

The following are examples of two typical electrodes of this category, the proportions being by weight of the electrode:

|  | 1 | 2 |
|---|---|---|
| Aluminium | 1.75 | 1.9 |
| Manganese | 1.30 | 1.35 |
| Silicon | 0.40 | 0.3 |
| Titanium | 0.25 | 0.15 |
| Sulphur | 0.03 | 0.025 |
| Phosphorus | 0.02 | 0.02 |
| $K_2CO_3$ | 0.1 |  |
| NaF | 0.1 | 0.1 |
| LiF | 0.25 | 0.2 |
| $Li_2CO_3$ | 0.1 | 0.1 |
| CsF | 0.1 | 0.1 |
| $K_2TiF_6$ | 0.25 | 0.35 |
| Potash feldspar | 3.0 | 4.0 |
| Soda feldspar | 3.0 | 2.0 |
| Magnetic iron oxide | 0.6 | 0.3 |
| $CaCO_3$ | 1.0 |  |
| $CaSiO_3$ |  | 1.5 |
| Iron | Balance | Balance | category 2

Electrodes of this category deposit weld metal of the following percentage composition by weight:

|  | Overall range | Preferred range |
|---|---|---|
| Aluminium | 0.2–0.9 | 0.5–0.75 |
| Silicon | [1] 0.35 | [1] 0.2 |
| Manganese | 0.3–1.25 | 0.7–1.0 |
| Titanium | [1] 0.25 | [1] 0.15 |
| Sulphur | [1] 0.04 | [1] 0.025 |
| Phosphorus | [1] 0.04 | [1] 0.250 |
| Carbon | 0.04–0.15 | 0.08–0.13 |
| Iron (apart from incidental impurities) | Balance | Balance |

The electrodes contain aluminum in the core, of which about half is recovered in the weld metal the remainder being oxidized to aluminum oxide which forms a slag.

The aluminum oxide presents a problem in that it interferes seriously with the deposition of the weld metal, tending to form irregular slag globules of high melting point which spoil the appearance of the weld and cause excessive undercut or sharp notches at the toes of the weld, which may seriously reduce the effective strength of a welded fabrication. The surface tension of the molten metal is affected and weld appearance deteriorates. A high spatter loss is associated with this condition.

The harmful effect of the aluminum oxide is counteracted by the inclusion of fluorides in the core of the electrode. When fluorides are present in the amount indicated below, the aluminum oxide dissolves in the liquid fluoride to form an acceptable slag. It is also highly desirable that the electrode should include a small amount of ferrotitanium with a view to eliminating, entirely or almost entirely, porosity in the weld deposit. The fluoride content includes calcium fluoride or cryolite but may also contain potassium titanofluoride or sodium fluoride.

The following is the overall composition of the electrode in percentages by weight:

Titanium as ferrotitanium    0.1 percent max.
Manganese    0.8—1.5 percent
Potassium carbonate    0—0.2 percent
Sodium or potassium silicate    0—0.3 percent
Flourides,    1.7—5.5 percent
  at least 1.7 percent of the fluoride content being calcium fluoride or cryolite
Titanium oxide as titanates or minerals    0.25 percent max.
Aluminum    1.2—2.6 percent
Silicon, other than in silicates and ferroalloys    0.03 percent max.
Iron as sheath    60—85 percent
Iron as powder or ferroalloys    balance The ferrotitanium preferably contains 25 percent Ti. The manganese includes manganese in the sheath (e.g. 0.4 percent) plus ferromanganese in the core, which preferably contains 80—90 percent Mn and may contain up to 7 percent C. The iron powder may contain up to 0.25 percent C.

Examples of typical electrodes of this category will now be given, these being followed by particulars of the mechanical properties and composition of the resulting weld deposits.

EXAMPLES OF CORE COMPOSITION IN PERCENT BY WEIGHT OF ELECTRODE

| Experimental No | 403A | 403 | 406 | 408 | 404 |  |
|---|---|---|---|---|---|---|
| Ferrotitanium (25% Ti) | 0.25 | 0.30 | 0.30 | 0.25 | 0.30 |  |
| Ferromanganese | 0.73 | 0.73 | 0.73 | 0.60 | 0.70 | 0.60 |
| $K_2CO_3$ | 0.07 | 0.07 | 0.14 | 0.14 | 0.07 | 0.17 |
| Fused sodium silicate | 0.2 | 0.2 | 0.2 | 0.2 | 0.2 | 0.26 |
| Rutile sand | 0.2 | 0.2 |  | 0.2 | 0.2 | 0.2 |
| $CaF_2$ | 2.2 |  | 3.5 | 3.3 | 2.7 | 3.3 |
| $Na_3AlF_6$ |  | 2.5 |  |  |  |  |
| $K_2TiF_6$ |  |  | 0.07 | 0.07 |  | 0.1 |
| NaF |  |  |  |  |  | 0.1 |
| Aluminium (wire) | 1.75 | 1.75 | 1.75 | 1.75 | 1.75 | 1.75 |
| Iron powder (low C) | 15.14 | 14.9 | 13.3 | 13.5 | 14.0 | 13.3 |

The above-noted constituents were contained in the core of the electrode, of which the iron sheath represented 80 percent by weight and was of the following composition 0.06 percent C, 0.4 percent Mn, trace Si, 0.03 percent S, 0.02 percent P, balance Fe.

MECHANICAL TEST RESULTS

| Experimental No | 403A | 403 | 406 | 408 | 404 | 411 |
|---|---|---|---|---|---|---|
| YP, t.s.i. (tons per square inch) | 25.12 | 25.44 | 20.80 | 27.04 | 20 20 | 27.2 |
| UTS, t.s.i. | 31.52 | 31.36 | 29.36 | 32.80 | 28.64 28 | 32.6 |
| Elongation, percent | 24 | 24.3 | 27 | 23 | 26 26 | 25 |
| Reduction of area | 51 | 48 | 49 | 45 | 60 55 | 45 |
| Charpy ft. lbs.:[1] |  |  |  |  |  |  |
| At 20° C | 54 | 43 | 74 | 76 | 52 | 50 |
| At 0° C | 38 | 34 | 69 | 61 | 39 | 35 |
| At −10° C | 29 | 26 | 58 | 43 | 28 | 34 |
| At −30° C | 24 | 20 | 46 | 37 | 22 | 29 |

[1] Average of 3 specimens.

WELD METAL COMPOSITION IN PERCENTAGES BY WEIGHT

| Experimental No | 403A | 403 | 406 | 408 | 404 | 411 |
|---|---|---|---|---|---|---|
| Manganese | 1.0 | 1.05 | 1.14 | 0.81 | 1.06 | 0.73 |
| Silicon | 0.25 | 0.27 | 0.21 | 0.22 | 0.22 | 0.23 |
| Titanium | 0.20 | 0.21 | 0.13 | 0.20 | 0.23 | 0.17 |
| Aluminium | 0.73 | 0.77 | 0.805 | 0.83 | 0.77 | 0.82 |
| Iron (apart from incidental impurities) | ([1]) | ([1]) | ([1]) | ([1]) | ([1]) | ([1]) |

[1] Balance.

Category 3

Electrodes of this category are based on the discovery that the good impact properties of the weld metal are retained, and indeed improved, and improved arc stabilization and easier slag removal are achieved when the core of electrodes of category 2 contains a chloride of one or more of the metals caesium, potassium and sodium in an amount of 0.1—1 percent by weight of the electrode. Similar beneficial results are obtained by the inclusion in the core of up to 1 percent by weight of the electrode of a carbonate of an alkaline earth metal or of an alkali metal. The content of silicate of sodium or potassium in the core may, moreover, be increased to 0.4 percent by weight of the electrode.

The above-stated modifications tend to reduce the content of the incidental impurities sulfur and phosphorus in the weld metal to a value which is normally below 0.016 percent in the case of each of these elements, so improving the impact resistance of the weld metal.

The following are the compositions of some typical electrodes of this category. In each case the sheath of the electrode was of the mild steel specified in category 2, and the core constituted 22 percent by weight of the electrode. The core constituents specified below are in percentages by weight of the electrode.

| Electrode | 1 | 2 | 3 | 4 | 5 | 6 |
|---|---|---|---|---|---|---|
| Aluminium | 1.75 | 1.80 | 1.75 | 1.75 | 1.75 | 2.2 |
| Titanium | 0.05 | 0.07 | 0.06 | 0.06 | 0.05 | 0.08 |
| Manganese | 1.0 | 0.9 | 0.85 | 0.85 | 0.85 | 0.93 |
| Silicon | 0.03 | 0.03 | 0.03 | 0.03 | 0.03 | 0.03 |
| NaF | 0.15 | 0.15 | 0.13 | 0.07 | | 0.13 |
| $CaF_2$ | 3.3 | 3.2 | 3.3 | 3.7 | 3.7 | 2.7 |
| $Na_3AlF_6$ | 0.16 | 0.15 | 0.17 | 0.17 | 0.17 | 0.17 |
| $K_2TiF_6$ | 0.10 | 0.10 | 0.10 | 0.10 | 0.10 | 0.10 |
| $CaCO_3$ | 0.20 | | | | | 0.53 |
| $K_2CO_3$ | 0.10 | 0.10 | 0.07 | 0.07 | 0.10 | 0.06 |
| $K_2TiO_3$ | 0.07 | | | 0.10 | 0.10 | |
| CsCl | 0.10 | | | | | |
| KCl | 0.20 | 0.35 | | | | 0.27 |
| NaCl | 0.05 | | | | | |
| Fused sodium silicate (33% NaO) | 0.30 | 0.36 | 0.27 | 0.27 | 0.27 | |
| Iron powder | (1) | (1) | (1) | (1) | (1) | (1) |

[1] Balance.

The following are the compositions of weld deposits produced by these electrodes:

| Electrode | 1 | 2 | 3 | 4 | 5 | 6 |
|---|---|---|---|---|---|---|
| Carbon, percent | 0.07 | 0.075 | 0.109 | 0.119 | 0.102 | 0.06 |
| Manganese, percent | 0.87 | 0.93 | 0.90 | 0.90 | 0.90 | 1.04 |
| Silicon (from silicate), percent | 0.21 | 0.24 | 0.19 | 0.23 | 0.18 | 0.14 |
| Titanium, percent | 0.13 | 0.09 | 0.06 | 0.11 | 0.11 | 0.08 |
| Aluminium, percent | 0.74 | 0.61 | 0.62 | 0.79 | 0.84 | 1.10 |
| Sulphur, percent | 0.013 | 0.011 | 0.018 | 0.018 | 0.015 | 0.02 |
| Phosphorus, percent | 0.014 | 0.012 | 0.015 | 0.015 | 0.015 | 0.012 |
| Iron | (1) | (1) | (1) | (1) | (1) | (1) |

[1] Balance.

The following are the mechanical properties of weld metal deposited by Electrodes 3—6:

| Electrode | 3 | 4 | 5 | 6 |
|---|---|---|---|---|
| Yield point, t.s.i. | 25.48 | 24.83 | 23.76 | 26.4 |
| U.T.S., t.s.i. | 31.4 | 33.64 | 31.92 | 31.04 |
| Percent elongation | 26.2 | 23.7 | 22.5 | 25 |
| Percent reduction of area | 45 | 44 | 40 | 62 |
| Charpy V: | | | | |
| At 20° C | | | | 93 |
| At 0° C | 61.5 | 55 | 57.3 | |
| At −20° C | 46 | 59 | 53 | 57 |

Category 4

The electrodes of this category are of the following composition in parts by weight of the electrode:

| | Overall range | Preferred range |
|---|---|---|
| Carbon | 0.3% maximum | 0.2% maximum. |
| Aluminium | 1.5 to 3.5% | 2 to 2.8%. |
| Manganese | 0.3 to 1.6% | 0.5 to 1.0%. |
| Silicon | 0 to 0.6% | 0.2 to 0.3%. |
| Fluorides | 8 to 16% | 10 to 15%. |

| | Overall range | Preferred range |
|---|---|---|
| Carbonates | 1 to 6% | 2.5 to 3.5%. |
| Slag balancers | 0 to 4% | 0.2 to 1.0%. |
| Iron (apart from incidental impurities) | Balance | Balance. |

The ratio by weight of fluorides to carbonates is 3.2—6 and preferably 4.2—4.7. The aluminum may be present in the core as metallic powder, ferroalloy or as wire.

Manganese is derived partly from the sheath and partly from ferromanganese or silicomanganese in the core. Ferromanganese typically contains 80 percent manganese and 0.5 percent carbon with balance substantially iron but a carbon level of 6 percent is acceptable. Silicomanganese typically contains 60 percent silicon and 40 percent manganese.

Silicon is derived chiefly from the core being present, for example, as a ferroalloy or as silicomanganese but a small amount, for example 0.02 percent of silicon may be present in the sheath.

The fluoride content of the electrode is such that the electrode contains at least 8 percent of calcium fluoride. When, however, the amount of calcium fluoride substantially exceeds this FIG. part can be replaced by cryolite. The carbonates are selected from barium, calcium, strontium or magnesium carbonate, but potassium carbonate may be used in an amount of up to 2 percent by weight of the total content of carbonates.

The slag balancers, which control the fluidity of the slag by stiffening it, are selected from alumina, silica, titania and zirconia and may be present as these oxides or as compounds of these oxides such as potassium titanate, sodium silicate or felspar. A small quantity of slag balancer may be helpful in giving exactly the degree of slag followup necessary. We prefer to use alumina but the other slag balancers are adequate but must not be used in sufficient quantity to give a significant alloying recovery into the weld metal due to reduction by aluminum To ensure that the titanium content of the weld metal does not exceed the above-stated amount and that zirconium is not present in the weld metal otherwise than as an incidental impurity, the amount of titania and/or zirconia should not exceed 0.5 percent by weight of the electrode.

Iron is derived from the sheath, ferroalloys and iron powder in the core. There is no objection to the use of iron powder containing significant amounts of carbon providing the amount of carbon does not exceed the above stated maximum. This is to ensure that carbon recovery into the weld metal does not exceed the limit stated below.

The electrodes of this category are intended primarily for welding in the horizontal and flat positions and give weld deposits of good shape with fine ripple marking, a good washout at the toes of the weld and weld metal of high ductility and good impact strength. The electrodes are easy to use, require no special degree of concentration on the part of the operator and hence reduce operating fatigue. The deposition rate of weld metal from the electrodes is high and hence the electrode assists in rapid welding and fabrication. The slag followup is good and the weld pool is easily observable.

The electrodes may contain iron powder in an amount of up to 35 percent by weight of the electrode. When iron powder is present in the core, the core should constitute at least 20 percent by weight of the electrode in order to ensure a fast deposition rate and the core may amount to as much as 48 percent by weight of the electrode. The range of 24—35 percent by weight of core to electrode is preferred. When the core contains no iron powder it is, of course, lighter and in this case the ratio by weight of core to electrode may be 14—20 percent and is preferably 16—18 percent.

The weld metal deposited by electrodes of this category is as follows:

|  | Overall range | Preferred range |
|---|---|---|
| Carbon, percent | [1] 0.13 | [1] 0.11 |
| Aluminium, percent | 0.25-1.0 | 0.45-0.8 |
| Manganese, percent | 0.4-1.8 | 0.6-1.2 |
| Silicon, percent | [1] 0.5 | 0.2-0.4 |
| Titanium, percent | [1] 0.12 | [1] 0.1 |
| Sulphur, percent | [1] 0.03 | [1] 0.02 |
| Phosphorus, percent | [1] 0.03 | [1] 0.02 |
| Iron | Balance | Balance |

[1] Maximum.

The following are examples of electrodes of this category. In each case the sheath of the electrode was of rimming quality steel of the following composition: Extra deep drawing quality rimming steel of composition: Carbon 0.04 percent; manganese 0.37 percent; silicon 0.01 percent; sulfur 0.021 percent; phosphorus 0.019 percent; balance iron.

The core compositions of these electrodes are as follows, the compositions being expressed in percentages by weight of the core:

|  | 1 | 2 | 3 | 4 | 5 | 6 | 7 | 8 | 9 |
|---|---|---|---|---|---|---|---|---|---|
| Aluminium powder | 8 | 9 | 8 | 8 | 9 | 10 | 9 | 6 | 16 |
| Ferromanganese | 3 | 2 | 3 | 3 | 3 | 3 | 3 | 2 | 5 |
| Ferrosilicon | 2 | 1 | 2 | 2 | 1.5 | 1.5 | 1 | 2.5 | 3 |
| Calcium fluoride | 40 | 48 | 52 | 35 | 30 | 25 | 18 | 16 | 60 |
| Silica |  | 1 | 1 | 1 |  |  |  |  |  |
| Alumina | 1 | 0.5 | ½ |  | 1 | 1 | 1 | 1 | 2 |
| Cryolite |  |  |  | 15 |  |  |  |  |  |
| Iron powder | 38 | 27.5 | 22½ | 24 | 48.5 | 54 | 64 | 69 |  |
| Calcium carbonate | 6 | 4 | 6 | 3 | 3 | 4 | 4 | 3½ | 12 |
| Magnesium carbonate | 2 | 7 | 5 | 9 | 4 | 1.5 |  |  | 2 |
| Core as percentage by weight of the electrode | 28 | 25 | 25 | 25 | 32 | 33 | 36 | 43 | 15 |

Mechanical Test Results from Example No. 1.
  Yield point t.s.i.    26.2
  U.T.S. t.s.i.    33.7
  Elongation percent    21
  R. of A. percent    47
  Charpy ft. lbs. at 20° C    45
  (average of three specimens)

Category 5

These electrodes include in some instances manganese oxide in the core and sufficient aluminum to reduce the oxide to manganese which is recovered, as such, in the weld metal. The core constitutes 30—33 percent by weight of the electrode and the core is of the following composition by weight:

|  | General range | Preferred range |
|---|---|---|
| Iron powder, percent | 0-40 | 5-30 |
| Aluminium powder, percent | 4-20 | 8-15 |
| Maganese oxide, percent | 0-15 | 3-10 |
| Iron oxide, percent | 0-25 | 2-15 |
| Silica, percent | 0-15 | 3-10 |
| Potassium titanate and/or rutile, percent | 0-10 | 1-7 |
| Carbonates, percent | 0-10 | 2-8 |
| Fluorides, percent | 10-40 | 15-30 | the total amount of manganese oxide, iron oxide and silica being at least 20 percent and the total amount of carbonates and fluorides being at least 15 percent.

The manganese oxide may be $MnO_2$, $Mn_2O_3$ or $MnO$. The carbonates content may be calcium carbonate, barium carbonate, strontium carbonate or magnesium carbonate. The silica may be present in the core as such, or in mineral form, e.g. as felspar or wollastonite. The fluoride content consists of calcium fluoride, with or without minor additions of cryolite, potassium silicofluoride, sodium fluoride and/or potassium fluoride.

The following are examples of core compositions of typical electrodes of this category:

|  | 1 | 2 | 3 | 4 | 5 |
|---|---|---|---|---|---|
| Iron powder | 30 | 30 | 30 | 22 | 30 |
| Aluminum powder | 12 | 12 | 12 | 13 | 12 |
| $MnO_2$ | 7 | 3 | 11 | 8 | 7 |
| Magnetite | 10 | 10 | 10 | 11 | 10 |
| Silica | 7 | 11 | 3 | 8 | 7 |
| $K_2TiO_3$ | 4 | 4 | 4 | 4 | 4 |
| $CaCO_3$ | 5 | 5 | 5 | 6 | 5 |
| $CaF_2$ | 25 | 25 | 25 | 18 | 22 |
| NaF |  |  |  | 10 | 3 |

The weld metal compositions obtained with these electrodes were as follows:

|  | 1 | 2 | 3 | 4 | 5 |
|---|---|---|---|---|---|
| Titanium, percent | 0.05 | 0.05 | 0.05 | 0.06 | 0.06 |
| Aluminum, percent | 0.40 | 0.30 | 0.41 | 0.41 | 0.47 |
| Manganese, percent | 1.35 | 0.70 | 1.85 | 1.31 | 1.34 |
| Silicon, percent | 0.51 | 0.70 | 0.28 | 0.45 | 0.53 |
| Carbon, percent | 0.06 | 0.08 | 0.05 | 0.06 | 0.06 |

Iron the balance, apart from incidental impurities.

Iron the balance, apart from incidental impurities.

The mechanical properties of weld metal obtained from these electrodes were as follows:

|  | 1 | 2 | 3 | 4 | 5 |
|---|---|---|---|---|---|
| Y.S., t.s.i | 23.4 | 20.2 | 27.4 | 24 | 25 |
| U.T.S., t.s.i | 32.6 | 31.5 | 37.4 | 32 | 33.9 |
| Elongation, percent of 2 inch gauge length | 23 | 26 | 19 | 19 | 21 |
| Reduction of area, percent | 40 | 45 | 35 | 30 | 30 |
| Charpy, ft. lbs.:[1] |  |  |  |  |  |
| At 20° C | 58 | 41 | 45 | 47 | 62 |
| At −30° C | 40 | 28 | 31 | 30 | 44 |

[1] Average of 3 specimens.

Certain further electrodes according to the invention and the conditions to be observed during use of these electrodes will now be described with reference to the accompanying drawings, in which.

Figure 1:
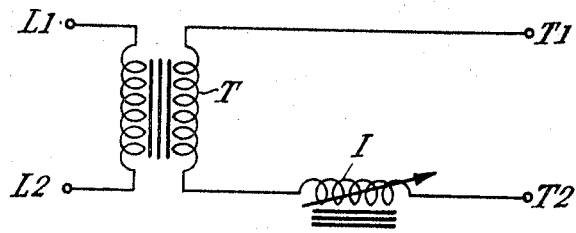
FIG. 1 is a transformer circuit.

When electrodes according to the invention are to be used with AC current at a current density of 20,000—100,000 amperes per sq. in., they should have a diameter in the range of 0.03—0.14 inch and be of the following composition in parts by weight of the electrode:

|  | Overall range | Preferred range |
|---|---|---|
| Aluminium | 1.5 to 4.5% | 2 to 2.8%. |
| Manganese | 0.3 to 1.6% | 0.5 to 1%. |
| Silicon | 0 to 0.6% | 0.25% maximum. |
| Calcium fluoride | 5 to 15% | 10 to 13%. |
| Arc stabilisers | 1 to 8% | 2 to 3.5%. |
| Slag modifiers | 1 to 4% | 1 to 4%. |
| Iron and incidental impurities | Balance | Balance. |

While the fluoride constituent is specified as calcium fluoride it may contain minor amounts of other fluorides such as sodium fluoride or cryolite.

The arc stabilizers in the above table are oxides of magnesium, alkali metals or alkaline earth metals, which may be present as such or as compounds, such as carbonates, titanates or silicates, which will decompose to yield these oxides at the temperature of the arc. The amount of fluoride plus arc stabilizers must amount to at least 5.5 percent by weight of the electrode. The slag modifiers in the above table are alumina, silica, titania and/or zirconia, as such or as compounds which will decompose to yield these oxides, with the proviso that the amount of titania and/or zirconia must not exceed 0.5 percent by weight of the electrode.

Calcium and magnesium carbonates are effective arc stabilizers but suitable alternatives are carbonates of strontium, barium, lithium, caesium, rubidium, sodium and potassium. Iron powder in the core of the electrode assists in arc stabilization and should preferably be present in an amount of not less than 6 percent by weight of the electrode. There is no objection to the use of grades of iron powder containing up to 0.3 percent by weight of carbon. As already noted, arc stabilizing elements may be present as carbonates or oxides or other compounds which will yield oxides at arc temperatures.

The above-described slag modifiers may be replaced by an oxide of manganese and/or iron, which also tends to stabilize the arc, but in this case the electrode will contain more aluminum to ensure oxidation to metal of said oxide and the preferred range of aluminum content will be 2.5—4.5 percent. In this case the content of manganese oxide must not exceed 3 percent but the content of iron oxide may be as high as 5 percent.

Electrodes as just described deposit ductile, tough weld metal containing 0.4—1.6 percent manganese, 0.2—1 percent aluminum, 0.5 percent max. silicon, 0.15 percent max. titanium + zirconium, balance iron apart from incidental impurities. Preferably the weld metal is of the following composition: carbon 0.11 percent max., aluminum 0.45—0.8 percent, manganese 0.6—1.1 percent, silicon 0.2—0.4 percent, titanium 0—0.1 percent, sulfur 0.03 percent max., phosphorus 0.03 percent max., iron the balance.

The AC power source may be of any conventional type and good results may be obtained by the use of conventional transformers primarily designed for welding with manual electrodes. Thus the power may be derived from the mains through a transformer or may be provided by a suitable AC generator. It may be single phase, three phase or derived from two phases or between line and neutral of a three phase supply. The load characteristic of the transformer may be of the drooping, sloping or level type.

A typical transformer circuit is shown in FIG. 1 of the drawings, in which $L_1$, $L_2$ represent the AC supply terminals, T represents a transformer, $I$ represents an inductance and $T_1$, $T_2$ are terminals for connection to the work and to the electrode respectively.

In a conventional circuit for manual arc welding, using a 250 volt AC supply, the transformer T is designed to give an open circuit voltage of 80 volts and the inductance $I$ has a value of 0.5 millihenries. For use in accordance with the present invention the transformer may be designed to give an open circuit voltage of 30—60 volts and the circuit so arranged as to cause the voltage to drop to 25—40 volts when the arc is struck and the characteristic to be substantially level, the voltage drop being within the range of 0—0.1 volts per ampere and preferably 0.008—0.06 volts per ampere.

The following are examples of typical electrodes for use under the above-described AC current conditions:

In each case the diameter of the electrode is 0.094", the sheath is of rimming quality mild steel containing 0.06 percent C, 0.5 percent Mn, 0.03 percent S, 0.03 percent P, balance iron; the core constitutes 30 percent by weight of the electrode and the composition is as follows in percentage by weight of the electrode:

|  | 1 | 2 | 3 | 4 | 5 |
|---|---|---|---|---|---|
| Aluminium powder, percent | 2.2 | 2.4 | 4.4 | 3.8 | 3.3 |
| Manganese, percent | 0.7 | 0.8 |  |  |  |
| $Mn_2O_3$, percent |  |  | 2.2 | 1.8 | 2 |
| Ferrosilicon, percent | 0.3 | 0.2 |  |  |  |
| Calcium fluoride, percent | 11 | 13.5 | 8 | 12 | 8 |
| Alumina, percent | 0.6 | 0.2 |  |  |  |
| Silica, percent |  | 0.5 |  |  |  |
| Iron powder, percent | 11 | 7 | 8 | 9 | 7 |
| $Fe_3O_4$, percent |  |  |  |  | 5 |
| $CaCO_3$, percent | 2 | 4 | 4 | 3 |  |
| $MgCO_3$, percent | 1 |  |  |  | 2 |
| $K_2CO_3$, percent | 1 | 1 |  |  |  |
| Iron as sheath | (¹) | (¹) | (¹) | (¹) | (¹) |

¹ Balance.

As will be apparent from the foregoing, the electrodes to be used in accordance with the invention consist of a mild steel sheath enclosing a core containing nitrogen fixing and deoxidizing elements and can successfully be used without shielding because these elements remove, or at least nullify, the harmful effects of atmospheric nitrogen and oxygen which enter the weld pool and which, but for the effect of deoxidizers and nitrogen fixers, would cause a very severe loss of impact strength and ductility. It is essential, in order to secure weld metal as specified above, that some amounts of aluminum manganese and silicon are recovered into the weld metal but the extent of recovery varies according to the following factors:

1. The arc length has a major effect on alloy recovery, a long arc tending to lose by atmospheric reaction much of the alloying elements present in the electrode and a short arc assisting their recovery.

2. The welding current also has a major effect on recovery, a high current increasing recovery and a low current diminishing recovery.

Accordingly, if the arc length is excessive too much aluminum will be lost and the weld metal is liable to become porous, while if the arc length is too short and the welding current is too high, so much aluminum, and perhaps also silicon and manganese, will be retained in the weld metal so as to increase its tensile strength and undesirably reduce its ductility.

It is accordingly highly desirable to operate the electrodes under conditions such that $V=1.9A+\chi$ when AC welding current is used and $V=1.1A\psi$ when DC welding current is used: $V$ being the arc voltage, $A$ being the current density expressed as $$\frac{1}{1000} \frac{c}{d},$$

where $c$ is the welding current in amperes and $d$ is the diameter of the electrode in inches, $\chi$ being between 18 and 29 and $\psi$ being between 19 and 30.

Figure 2:
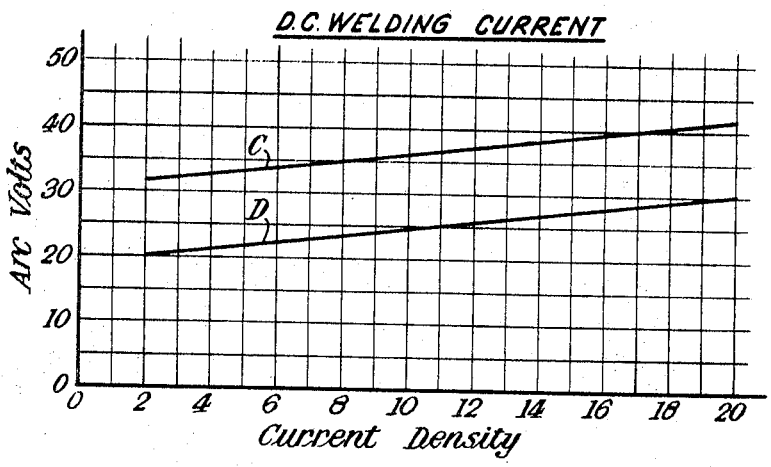
FIGS. 2 and 3 are graphs illustrating conditions of electrode operation with DC and AC welding current respectively.
Figure 3:
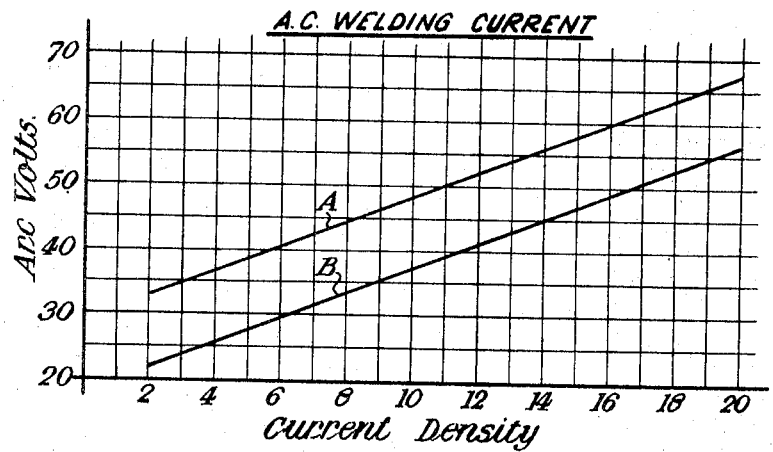

Operation thus takes place in the regions between the lines A and B in FIG. 2 and between the lines C and D in FIG. 3 of the drawings, in which arc voltage is plotted as ordinates and current density as abscissae. These lines are as follows:

Line A    $V=1.9A+29$
Line B    $V=1.9A+18$
Line C    $V=1.1A+30$
Line D    $V=1.1A+19$ If operation takes place above the line A or C the weld metal tends to exhibit porosity while if operation takes place below the line B or D the weld metal tends to exhibit a loss of ductility and impact strength.

Satisfactory weld metal can be secured by compliance with these operating conditions using a tubular electrode having within its mild steel sheath a core containing 0.8—4.5 percent aluminum, 0—0.6 percent silicon, 0—0.3 percent titanium and 0.3—1.6 percent manganese based on the weight of the electrode.

The following are the results of tests showing the effect of working under different conditions with a DC supply on the electrode identified as No. 1 in category 5 above:

|  | Test 1 | Test 2 | Test 3 |
|---|---|---|---|
| Arc, volts | 21 | 26 | 35 |
| Welding current, amps | 400 | 400 | 400 |
| Current density, as defined above | 4.3 | 4.3 | 4.3 |
| Al in weld | 1.3 | 0.7 | 0.3 |
| Si in weld | 0.5 | 0.25 | 0.12 |
| Mn in weld | 1.4 | 0.95 | 0.7 |
| Ultimate tensile strength of weld metal, t.s.i. | 39 | 33 | 24 |
| Elongation, percent | 16 | 24 | 10 |
| Reduction of area, percent | 31 | 47 | 15 |
| Charpy Impact Strength at 0° C | 18 | 46 | 34 |
| Weld metal soundness | Good | Good | Porous |

We claim:

1. A process of automatic or semiautomatic welding which consists in arc depositing from a cored tubular electrode, having a mild steel sheath devoid of external flux, without external shielding of the arc, weld metal having an elongation of at least 18 percent, a reduction of area of at least 25 percent, and a Charpy impact strength of at least 35 ft/lbs. at 20° C and at least 20 ft/lbs. at −30° C when tested in accordance with the mechanical test procedure given in B.S.S. 639, 1964, the weld electrode includes the following materials in such quantities such that weld metal is of the following composition by weight:

aluminum 0.12—1.3 percent
manganese 0.3—2 percent
silicon 0.1—1 percent
carbon 0.12 percent max.
titanium 0.12 percent max. if the silicon content exceeds 0.35 percent and 0.25 percent max. if the silicon content is 0.35 percent or less
balance iron apart from incidental impurities.

2. A process as claimed in claim 1, in which the weld metal contains 0.12—0.8 percent aluminum, 0.7—1.75 percent manganese, 0.4—0.85 percent silicon and a maximum carbon content of 0.08 percent.

3. A process as claimed in claim 1, in which the electrode is used with AC current at a current density of 20,000—120,000 amperes per sq.in.

4. A process as claimed in claim 3, in which the power supply yields an open current voltage of 30—60 volts and a voltage drop not exceeding 0.1 volts per ampere.

5. A process as claimed in claim 1, in which the welding operation is carried out under conditions such that $V=1.9A+\chi$ when AC welding current is used and $V=1.1A+\psi$ when DC welding current is used; $V$ being the arc voltage, $A$ being the current density as hereinbefore defined, $\chi$ being between 18 and 29 and $\psi$ being between 19 and 30.

6. A process as claimed in claim 5, in which the core of the electrode contains 0.8—4.5 percent aluminum, 0—0.6 percent silicon, 0—0.3 percent titanium and 0.3—1.6 percent manganese based on the weight of the electrode.